US00RE34693E

United States Patent [19]

Plocek et al.

[11] E Patent Number: Re. 34,693

[45] Reissued Date of Patent: Aug. 9, 1994

[54] ELECTRICAL CONNECTOR ASSEMBLY FOR VEHICULAR STEERING WHEEL

[75] Inventors: Edward J. Plocek, Lisle; Stephen Z. Weiss, Highland Park; Maciej Pike-Biegunski, Warrenville, all of Ill.

[73] Assignee: Molex Incorporated, Lisle, Ill.

[21] Appl. No.: 49,887

[22] Filed: Apr. 20, 1993

Related U.S. Patent Documents

Reissue of:

[64] Patent No.: 5,009,604
Issued: Apr. 23, 1991
Appl. No.: 445,514
Filed: Dec. 4, 1989

U.S. Applications:

[63] Continuation-in-part of Ser. No. 252,308, Oct. 3, 1988, Pat. No. 4,904,190.

[51] Int. Cl.[5] ..... H01R 39/02; H01R 39/06

[52] U.S. Cl. ..... 439/15; 439/24; 439/29

[58] Field of Search ..... 439/11, 12, 13, 15, 439/18, 21, 22, 24, 27, 29

[56] References Cited

U.S. PATENT DOCUMENTS

| | | | |
|---|---|---|---|
| 1,174,379 | 3/1916 | Bacon . | |
| 2,477,901 | 8/1949 | Robboy | 174/86 |
| 2,832,940 | 4/1958 | Furpahs | 339/8 |
| 4,157,854 | 6/1979 | Beauch | 339/5 M |
| 4,336,974 | 6/1982 | Wilson | 439/13 |
| 4,702,705 | 10/1987 | Hirano et al. | 439/15 |

*Primary Examiner*—Eugene F. Desmond
*Attorney, Agent, or Firm*—A. A. Tirva

[57] ABSTRACT

An electrical connector assembly is provided for components that are rotatable relative to one another, such as a steering column and a steering wheel for a vehicle. The assembly comprises a steering column cassette and an opposed mateable steering wheel cassette. Concentric recesses are formed in the mating face of at least one of the cassettes. The opposed mating surfaces are further defined by discrete concentric conductive portions formed on or disposed in the cassettes. At least one resilient electrically conductive contact member is resiliently engaged between the cassettes to make redundant electrical contact with the opposed cassette. The cassettes may be appropriately configured for environmental sealing.

16 Claims, 9 Drawing Sheets

ELECTRICAL CONNECTOR ASSEMBLY FOR VEHICULAR STEERING WHEEL

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 252,308 which was filed on Oct. 3, 1988, now U.S. Pat. No. 4,904,190.

BACKGROUND OF THE INVENTION

Vehicular steering wheel assemblies typically comprise a centrally disposed nonrotatable steering column and a rotatable steering wheel. A rotatable shaft extends centrally through the steering column to enable the movements of the steering wheel to be transmitted appropriately to the wheels on which the vehicle is supported.

Virtually all vehicles require electrical connections to be made between the stationary steering column and the rotatable steering wheel. For example, electrical circuits extending from the nonrotatable steering column to the rotatable steering wheel may relate to the horn, driver-side emergency air bags and electrical accessories that may have primary or redundant controls mounted on the hub of the steering wheel.

The typical prior art electrical connections for steering wheel assemblies include opposed plates mounted respectively on the stationary column and the rotatable steering wheel with flat flexible cables extending therebetween. This prior art assembly might include thirty feet of flat flexible cable wound in a clock spring manner. Opposed ends of the flat flexible cables are terminated to electrical connectors, which in turn are mounted to the opposed plates on the stationary steering column and the rotatable steering wheel. These prior art assemblies with flat flexible cables extending between the stationary steering column and the rotatable steering wheel have a very high relative cost because of the large number of components and the large amount of flat flexible cable required. Additionally, it is extremely difficult to assemble the prior art components in a manner that ensures relatively free movement of the rotatable steering wheel without entanglement of the flat flexible cable at any location throughout the movement. These prior art assemblies relying on flat flexible cables have also prevented the use of a steering wheel that could undergo free rotation relative to the stationary steering column. Thus, to prevent overstress on the flat flexible cable it is necessary to provide these prior art structures with appropriate means for preventing excessive rotation of the steering wheel relative to the stationary steering column. Even if these prior art assemblies can be properly assembled by original equipment manufacturers, there can be no assurance that automobile mechanics performing routine maintenance and repairs will achieve proper reassembly. It has also been found that the flat flexible cables will cause an audibly noticeable "cable slap" during normal rotation of the steering wheel. In some instances, a separate sound insulation has been required to attenuate the "cable slap" noises.

The prior art has included attempts to overcome the above described deficiencies of steering wheel assemblies employing flat flexible cable. In general these prior art attempts include opposed annular rings of conductive material nonrigidly mounted respectively to nonconductive portions of the stationary steering column and the rotatable steering wheel. The mounting of the rings has required complex means for permitting a controlled axial movement of the rings relative to the respective steering column and steering wheel. The prior art structures have further included complex biasing means for urging the annular electrically conductive rings toward one another and away from the respective steering column and steering wheel. The electrically conductive rings of the prior art structure are formed with annular channels having generally semicircular cross sections. Rigid metallic ball bearings are disposed in the channel between the annular nonrigidly mounted electrically conductive rings of the prior art structure to provide electrical connection between the rings. The contact against the rigid metallic ball bearings is achieved by the complex biasing means which urge the rings toward the rigid ball bearings. At least three or more ball bearings typically are provided for each pair of annular rings, with the prior art assembly typically being provided with complex means for controlling the circumferential position of the rigid ball bearings relative to one another to ensure that the ball bearings do not all roll together at a single location relative to the annular electrically conductive rings. Examples of assemblies of this general type are shown in U.S. Pat. No. 4,548,454 which issued to Zeller et al. on Oct. 22, 1985; U.S. Pat. No. 4,462,648 which issued to Fohl on July 31, 1984; and U.S. Pat. No. 4,475,779 which issued to Fohl on Oct. 9, 1984. Although this prior art avoids the use of flat flexible cables, the resulting structure with axially movable electrically conductive rings, springs to axially move the rings, electrical connections to the movable rings, rigid ball bearings between the rings and means for controlling the location of the ball bearings all are extremely complex and expensive.

Other prior art steering wheel assemblies include an apparatus having complexly configured annular contacts which are incorporated concentrically in interfitting electrical contact. These complexly configured rings are maintained in electrical contact by a plurality of coil springs aligned such that the longitudinal axes of the coil springs are parallel to the longitudinal axis of the steering column to urge the complexly configured electrically conductive rings in axial directions and into electrical contact with one another. The complexly configured rings are extremely expensive to manufacture, and the entire assembly is costly and undesirably complex. A device of this type is shown in U.S. Pat. No. 4,714,430 which issued to Zeller on Dec. 22, 1987.

The above described attempts to avoid flat flexible cable sometimes have replaced the "cable slap" noise with audibly distinct clicking caused by the complex interengagement of parts.

The complexities of all of the above described prior art substantially prevent increases in circuit density without corresponding increases in at least the radial dimensions of the assemblies and the entire steering column.

Recent advances have been made in three-dimensional molding technology employing the discrete plating of electrically conductive materials to various nonconductive plastic structures. In particular, the electrically conductive materials have been selectively disposed on the plastic to define electrically conductive surface regions extending through a three-dimensional matrix to define discrete conductive tracks for incorporation into electrical circuits. This three-dimensional molding technology is currently available from Mint Pac and others.

In view of the above, it is an object of the subject invention to provide improved electrical connections for steering wheel assemblies.

It is another object of the subject invention to provide electrical connections for steering wheel assemblies that can be manufactured easily and inexpensively, and that can be efficiently assembled.

Another object of the subject invention is to provide electrical connections between stationary and rotatable objects that avoid the use of cables and that employ a substantially minimum number of components.

Still a further object of the subject invention is to provide improved electrical connections between stationary and rotatable objects that can be efficiently environmentally sealed.

Yet another object of the subject invention is to provide efficient electrical connection between stationary and rotatable objects, such as in a steering wheel assembly, which insures redundant high quality electrical connection for all relative rotational orientations.

A additional object of the subject invention is to provide greater circuit density for electrical connection between a stationary steering column and a rotatable steering wheel, thereby enabling more electrical controls on the steering wheel.

Another object of the subject invention is to provide for continuous bidirectional rotation in an electrical connection between a steering column and a steering wheel.

Still another object of the subject invention is to provide a substantially noise-free electrical connection between a steering column and a steering wheel.

SUMMARY OF THE INVENTION

The electrical connector assembly of the subject invention is directed to a first housing that may be mounted on a nonrotatable steering column and a second housing that may be mounted on or comprise a portion of a rotatable steering wheel or the rotatable shaft extending from the steering wheel. The assembly frequently is referred to in the trade as a steering cassette assembly. The stationary and rotatable housings of the assembly comprise portions formed from a nonconductive material. These nonconductive portions may comprise a molded plastic material.

The stationary and rotatable housings of the subject electrical connector assembly further comprise at least one opposed pair of annular conductive portions which are generally concentric with the axis of rotation of the rotatable housing. At least one of the annular conductive portions in each opposed pair may be disposed in a recess in the corresponding nonconductive portions of the stationary or rotatable housing. The annular conductive portions of the stationary and rotatable housings preferably are nonrotatably mounted to the corresponding housing. Thus, the annular conductive portion of the stationary housing will remain stationary, while the annular conductive portion of the rotatable housing will rotate with the rotatable housing. The relative nonrotatable mounting of the annular conductive portions to the respective stationary and rotatable housings avoids the complex biased axially movable conductor mountings as in the prior art explained above.

The annular conductive portions of the stationary and rotatable housings may be defined by metallic rings rigidly secured in concentric arrays. Thus, the annular conductive portions may be defined by insert molding, stamped circuitry or the like. Alternatively, the annular conductive portions may be defined by an electrically conductive material selectively plated to the nonconductive material to define discrete annular conductive tracks on a nonconductive substrate of the housings. These annular conductive portions may comprise annular surface regions of the associated stationary or rotatable housings. Preferably the stationary and rotatable housing each are provided with a plurality of concentric annular conductive portions as defined above. The annular conductive portions may comprise or be connected to other conductive portions which are disposed in the respective rotatable and nonrotatable housing to permit electrical connection with other electrical circuitry. For example, the stationary and rotatable housings may be provided with axially aligned through holes that are plated with or otherwise receive conductive material to permit electrical connection of the concentric conductive portions to other circuitry. Plated annular conductive portions and plated through holes, as referred to above, may be defined by the above mentioned three-dimensional molding technology which is available through Mint Pac and others. The stationary and rotatable housings including the respective annular concentric conductive portions thereof may define a preassembled cassette or cartridge that is removably mountable to a stationary steering column or a rotatable steering wheel component respectively.

Electrical connection between the stationary and rotatable housings is provided by resilient conductive contact members disposed at selected radial positions between the housings. In particular, the resilient conductive contact members may be defined by at least one electrically conductive wave washer having a radius substantially equal to the radius defined by the opposed concentric conductive portions of the stationary and rotatable housings. The wave washer may be retained in a concentric orientation relative to the corresponding opposed conductive portions by an annular recess formed in the nonconductive portions of the stationary and/or rotatable housings. The wave washer may be formed to define a plurality of undulations about its circumference, and preferably at least three undulations about its circumference to provide redundant electrical contact between each pair of opposed conductive portions. Preferably a plurality of wave washers of different radial dimensions are disposed in a concentric array to align with and achieve electrical contact between a corresponding array of opposed pairs of electrically conductive portions on the respective stationary and rotatable housings.

The resilient conductive contact members may alternatively be defined by resilient electrically conductive spheres that are mounted at an appropriate radial position to engage the concentric conductive portions in each pair of opposed concentric conductive portions. The resilient electrically conductive spheres may be molded or otherwise formed from an electrically conductive polymer. The resilient electrically conductive spheres may be retained in a proper radial position by an annular recess formed in the stationary housing and/or in the rotatable housing. A plurality of resilient electrically conductive spheres may be provided for each of the concentric conductive portions on the stationary and rotatable housings. In particular, at least three resilient electrically conductive spheres may be provided for each of the opposed pairs of conductive portions on the respective stationary and rotatable housings. The resilient electrically conductive spheres for each pair of opposed electrically conductive portions may be maintained in a selected circumferential orientation to one another by a nonconductive support means disposed between the rotatable and nonrotatable housings. For example, the nonconductive support means may be defined by a generally planar circular spacer disk having at least one array of apertures extending therethrough, with each such aperture being dimensioned to receive one resilient electrically conductive sphere. The apertures may be disposed on the nonconductive spacer disk to separate the resilient electrically conductive spheres circumferentially by a selected amount, such as 120°.

In still other embodiments, at least one of the housings may be injection molded without the concentric conductive portions plated thereto or insert molded therein. Rather, a concentric array of wave washers may be inserted into a previously molded housing. The wave washers may include integral contacts extending generally parallel to the rotational axis of the rotatable housing. These contacts may be dimensioned to extend through appropriately dimensioned and aligned through holes in the associated housing for subsequent electrical and mechanical connection to circuitry thereon. The undulations in these wave washers may define peaks sufficient to cause electrical contact with a generally planar contact insert molded or secured by other means into an annular groove of one of the opposed housings.

In still another embodiment, both housings may be injection molded without the concentric contacts plated thereto or insert molded therein. In these embodiments pairs of concentric wave washers may be mounted in opposed relationship in the concentric grooves formed in the opposed rotatable and nonrotatable housings. Each wave washer in each pair of wave washers may be provided with contacts extending generally parallel to the rotational axis of the rotatable housing. However, the wave washers in each said pair will be oriented such that the respective contacts extend in opposite directions. In this embodiment the contact of each wave washer will extend through a correspondingly configured aperture in each housing. To ensure high quality continuous electrical contact between the wave washers in each pair for all relative rotational alignments of the housings, this embodiment of the invention may further comprise a corresponding array of substantially planar washers disposed intermediate the wave washers in each opposed pair. Thus, regardless of the rotational orientation of the undulations in the opposed wave washers, consistently high normal contact forces will be achieved against the planar washer by the associated pair of wave washers. In this embodiment, shifting of the planar wave washer in a radial direction can be prevented by having the grooves in one of the housing members be deeper than the grooves in the other housing member. By this construction, the planar washer can be trapped in a groove to prevent lateral or radial shifting.

In any or all of the above described embodiments, the electrical connector assembly may further include a nonconductive lubricant to ensure wear of the contacts or conductive surfaces. The lubricant preferably maintains adequate viscosity during the broad ranges of temperature to which the vehicle may be subjected.

In many environments the contact provided between the rotatable and nonrotatable housings should be splash proof or otherwise environmentally protected. This environmental sealing may be achieved by appropriately sealing the entire steering column. Alternatively, generally annular sealing means may be provided between the stationary and rotatable housings at radially outward and/or radially inward positions thereon. The annular sealing means may comprise a labyrinth seal comprising interengaging annular grooves and ridges on the opposed portions of the stationary and rotatable housings. Alternatively, appropriately configured annular gaskets may be received in correspondingly dimensioned annular grooves in the respective stationary and rotatable housings.

The electrical connector assemblies described above are formed from substantially fewer components than corresponding prior art structures for achieving electrical connection between a stationary and a rotatable member. Additionally, the fewer components provided by the subject assembly are easily assemblable or reassemblable, thereby providing further efficiencies. This ease of assembly is further attributable to the continuous bidirectional rotation which is enabled, thereby avoiding the need to align the members at a particular rotational starting point which had been necessary in assemblies employing flat flexible cable. In addition to the lower costs and the assembly efficiencies, the subject design ensures high quality redundant electrical connection for each circuit required between the stationary and rotatable housings. The simple design with few components further enables the extremely important advantage of much greater densities without corresponding increases in the size of the assembly or cassette. This enables more electronic controls to be placed on the steering wheel than had previously been possible. Furthermore, the subject design entirely eliminates the bothersome "cable slap" or clicking noises which had been present in the prior art, thereby avoiding the need for separate sound insulation.

DETAILED DESCRIPTION OF THE PREFERRED EMBODIMENTS

Figure 1:
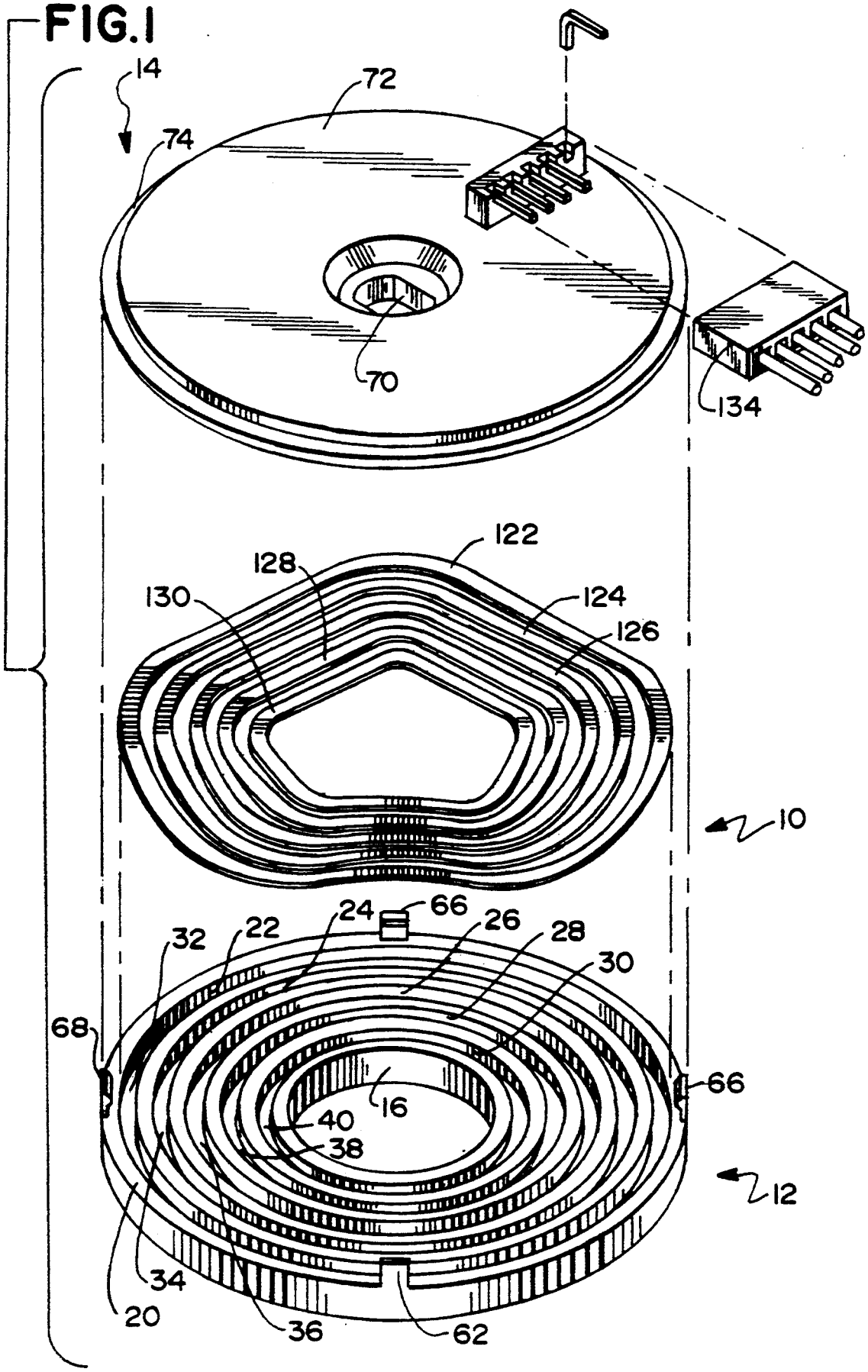
FIG. 1 is an exploded perspective view of a steering column electrical connector assembly in accordance with the subject invention.
Figure 2:
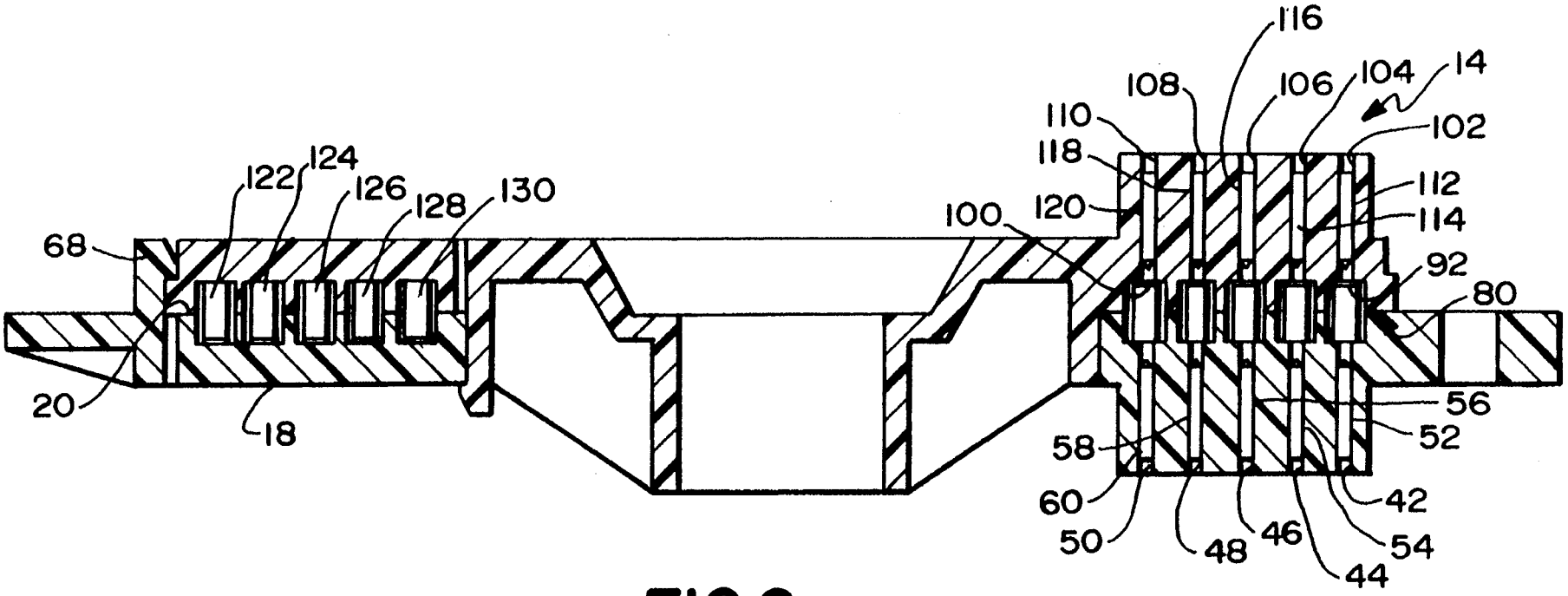
FIG. 2 is a cross-sectional view of the electrical connector assembly of FIG. 1 in its assembled condition.

A steering column electrical connector assembly in accordance with the subject invention is illustrated in FIGS. 1 and 2 and is identified generally by the numeral 10. The assembly 10 comprises a steering column cassette 12, and a mateable steering wheel cassette 14. The cassettes 12 and 14 are molded from a nonconductive plastic material and preferably an amorphous thermoplastic polyetherimide with glass reinforcing. The cassettes 12 and 14 effectively define mateable housings for conductive portions of the assembly 10 as explained herein.

The steering column cassette 12 is of generally circular configuration and includes a generally circular through aperture 16 concentrically disposed therein. The steering column cassette 12 further comprises a steering column mounting surface 18 and an opposed mating surface 20. The mating surface 20 of the steering column cassette 12 includes a plurality of annular concentric recesses 22–30 molded therein. The concentric recesses 22–30 each are provided with continuous electrically conductive surfaces plated thereon to define an array of discrete concentric conductive plated tracks 32–40 in the recesses 22–30 respectively. The steering column cassette 12 is further characterized by an array of through apertures 42–50 extending into the respective annular passages 22–30 from the steering column mounting side 18 thereof. The through passages 42–50 are also appropriately plated with the conductive material so as to be electrically connected to the concentric conductive tracks 32–40 respectively. The electrically conductive plating on the through apertures 42–50 and the electrically conductive concentric tracks 32–40 preferably are defined by nickel or copper discretely plated on the indicated surface portions of the steering column cassette 12. In view of this construction, terminals or other contact members can be inserted into the plated through holes 42–50 to achieve electrical contact respectively with the discrete concentric conductive tracks 32–40. The molding of the steering column cassette 12 and the plating of the discrete conductive portions thereon preferably is carried out with three-dimensional molding technology that is available through Mint Pac and others. Alternatively, however, the concentric conductive tracks 32–40 may define stamped and formed members insert molded into the steering column cassette 12 such that the plastic of the steering column cassette 12 defines a three-dimensional matrix surrounding and supporting at least portions of the conductive tracks 32–40.

The steering column cassette 12 is further provided with resilient cantilevered latches 62–68 unitarily molded therewith for loosely connecting the steering column cassette 12 to the steering wheel cassette 14. In particular, the latched connection between the steering column cassette 12 and the steering wheel cassette 14 achieved by the latches 62–68 limits the relative axial movement therebetween, but permits free rotational movement.

The steering wheel cassette 14 is provided with a central mounting aperture 70 which is of non-circular configuration and is mateable to corresponding structure on a steering wheel. The non-circular configuration of the aperture 70 enables the aperture 70 to be nonrotatable with respect to a rotatable shaft extending from a steering wheel, and to thereby rotate relative to the steering column cassette 12 in response to rotative forces exerted on a steering wheel.

The steering wheel cassette 14 includes a mounting surface 72 for mounting in opposed relationship to the steering wheel. The outer circumference of the surface 72 is characterized by a generally rabbet-like groove 74 which is engageable by the latches 62–68 on the steering column cassette 12.

The steering wheel cassette 14 is further characterized by a mating surface 80 having concentric recesses 82–90 molded therein. As shown in FIG. 2, the recesses 82–90 molded into the steering wheel cassette 14 are concentric and registrable with the recesses 22–30 in the steering column cassette 12. Portions of each recess 82–90 molded in the steering wheel cassette 14 are provided with continuous annular electrically conductive portions plated thereon or insert molded therein to define discrete concentric conductive tracks 92–100 which are registrable with the concentric conductive tracks 32–40 on the steering column cassette 12. The steering wheel cassette 14 is further molded to include through apertures 102–110 which also are appropriately plated with the electrically conductive material or are provided with insert molded contacts which are unitary with or electrically connected to the respective concentric conductive tracks 92–100. Terminals 112–120 are electrically connected to the plated through holes 102–110 to permit electrical connection of the steering wheel cassette 14 to other circuitry as appropriate. The steering wheel cassette also preferably employs the three-dimensional molding technology described above.

The assembly 10 further comprises an array of circular wave washers 122–130 which are dimensioned respectively to be received within the concentric recesses 22–30 and 82–90 molded respectively in the steering column cassette 12 and the steering wheel cassette 14. The amplitude of the waves defined by the wave washers 122–130 is such that the respective wave washers 122–130 are deflected by the assembly of the cassettes 12 and 14 to achieve a high quality electrical connection to the concentric conductive tracks 32–40 of the steering column cassette 12 and to the concentric conductive tracks 92–100 of the steering wheel cassette 14. Additionally, as shown most clearly in FIG. 1, each electrically conductive wave washer 122–130 is formed to define four waves in each direction about its circumference. Thus, each wave washer will achieve redundant electrical connection between the concentric conductive tracks 32–40 and 92–100 respectively.

Electrical connectors 132 and 134, as shown in FIG. 1, can be employed to make appropriate electrical connection to the terminals 52–60 in the steering column cassette 12 and to the terminals 112–120 in the steering wheel cassette 14.

A substantially inert lubricant which exhibits acceptable viscosity and lubricating characteristics is disposed in the cassettes 12 and 14 to prevent binding and excessive wear, and to ensure smooth, noiseless bidirectional rotation. The lubricant will sufficiently fill each of the recesses 22–30, 82–90 to lubricate all conductor-to-conductor contacting surfaces. The lubricant is a nonconductive material to prevent short circuits between adjacent annular circuits. Satisfactory electrical contact will be achieved, however, despite the nonconductivity of the lubricant. In particular, electrical contact will be maintained through gaps in the molecular structure of the microscopically thin layer of lubricant between opposed surfaces of the conductive tracks. The lubricant must exhibit adequate lubricating characteristics through broad ranges of temperature. Acceptable lubricants include fluorinated hydrocarbons and polyether esters.

It will be appreciated that the assembly 10 achieves redundant high quality electrical connection for all possible rotational orientations of the steering wheel cassette 14 relative to the nonrotatably mounted steering column cassette 12. Additionally, it will be appreciated that the assembly 10 is of extremely simple construction, with few parts, easy assembly, and continuous noise-free bidirectional rotatability after assembly.

Figure 3:
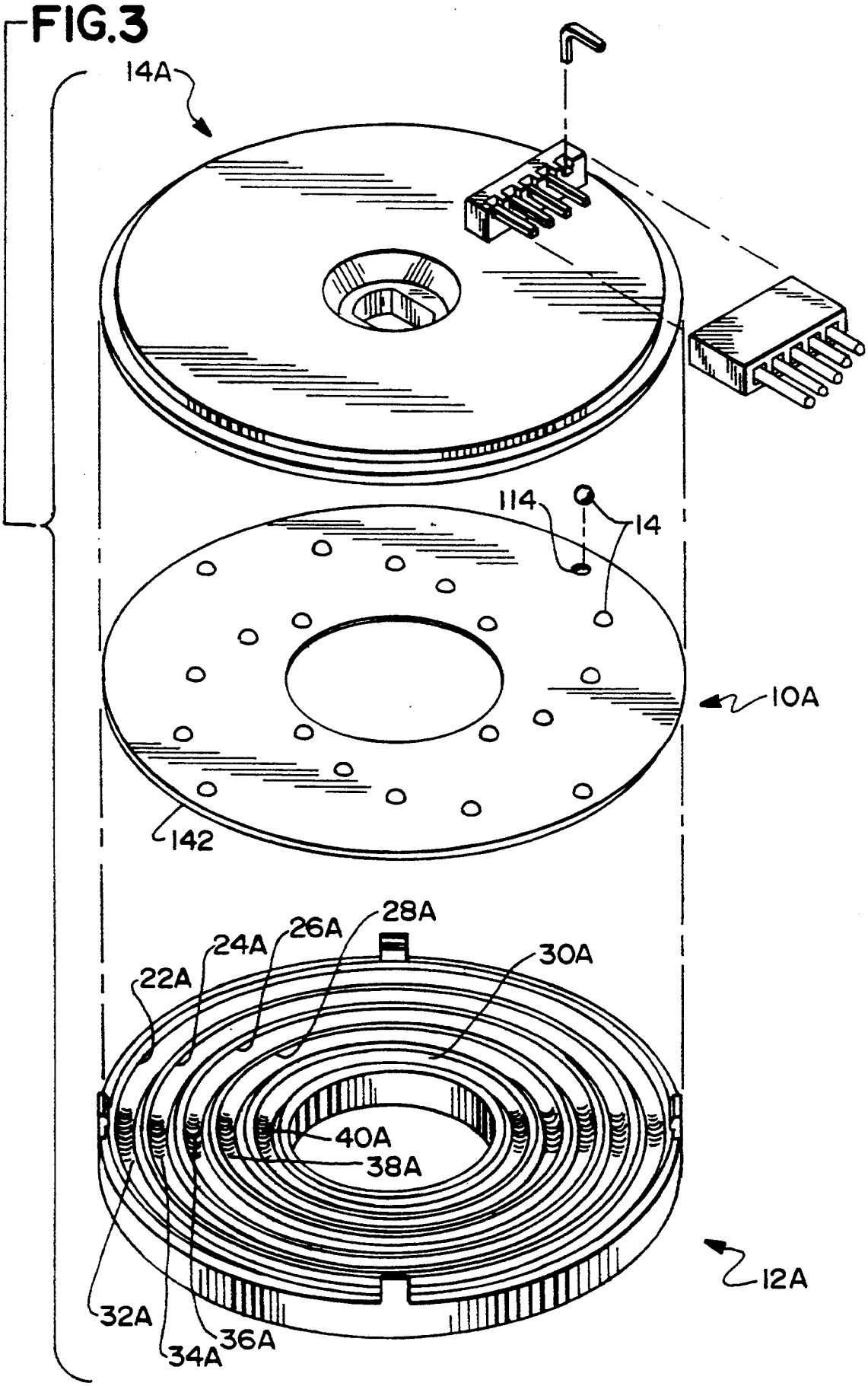
FIG. 3 is an exploded perspective view of an alternate steering column electrical connector assembly in accordance with the subject invention.
Figure 4:
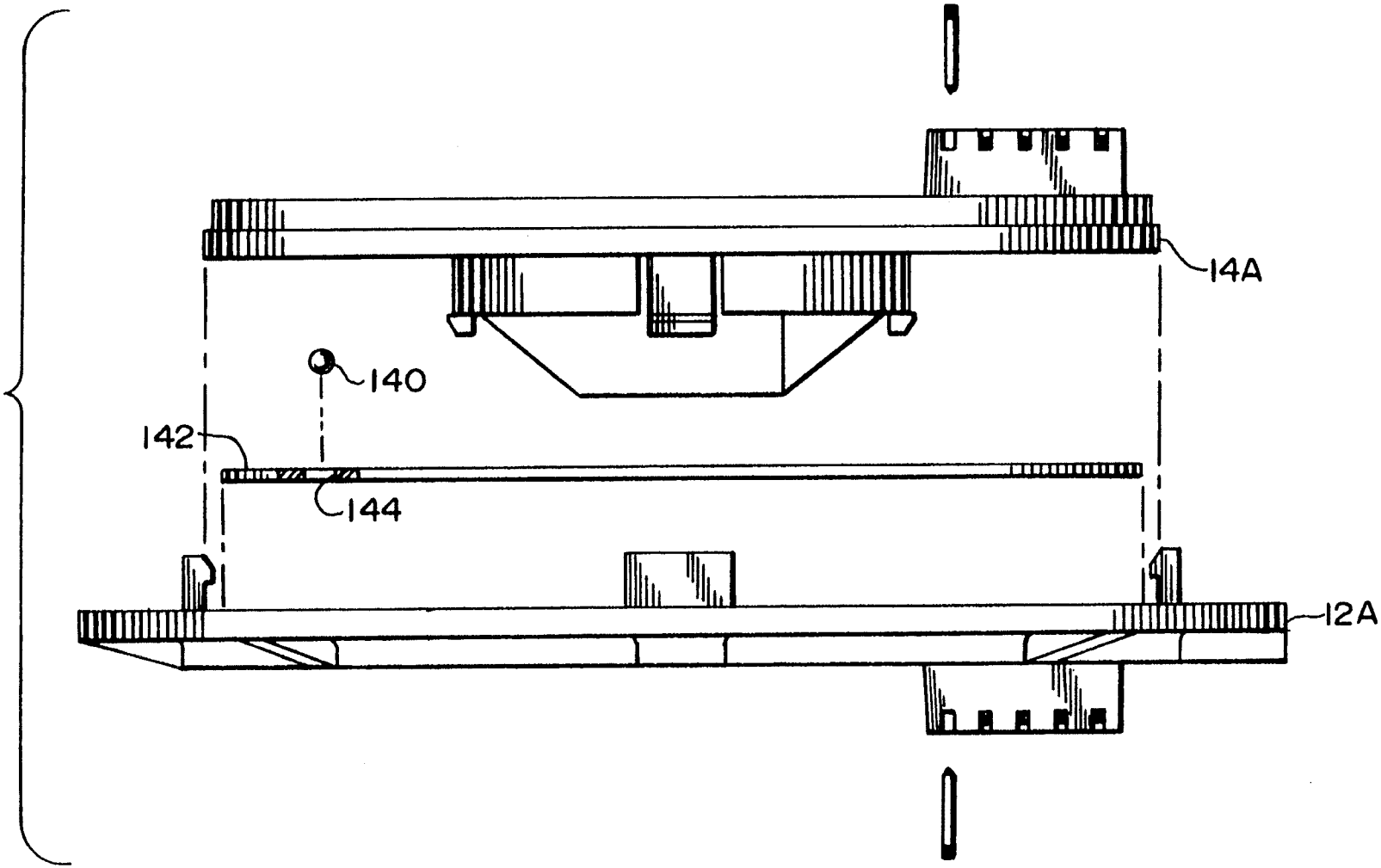
FIG. 4 is an exploded cross-sectional view of the electrical connector assembly depicted in FIG. 3.
Figure 5:
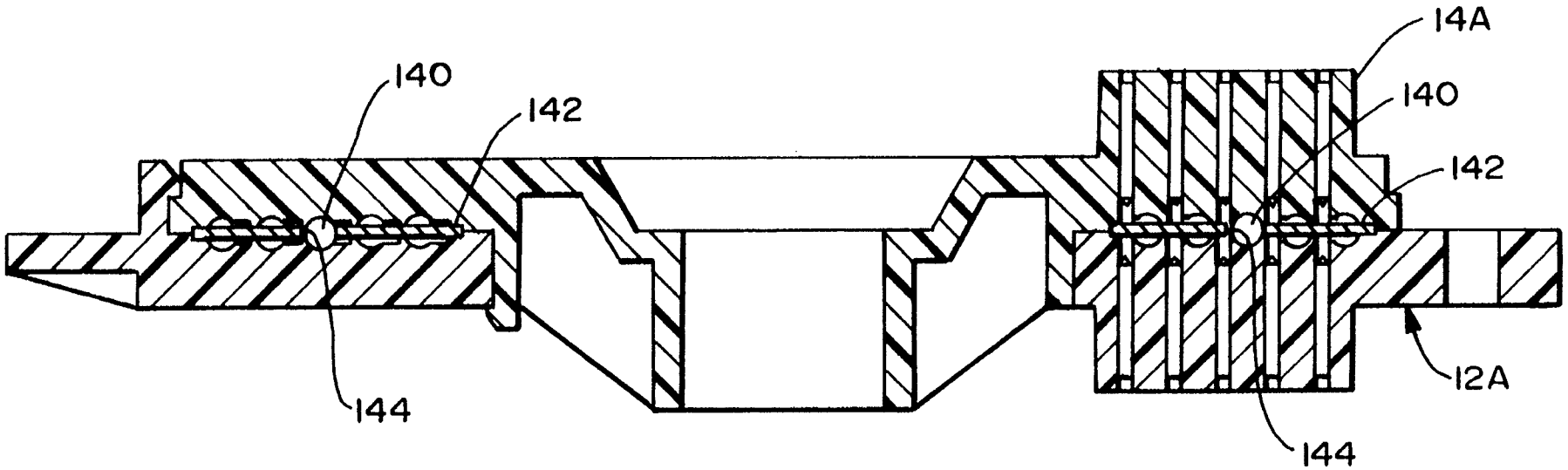
FIG. 5 is a cross-sectional view of the electrical connector assembly of FIGS. 3 and 4 in the assembled condition.

An alternate embodiment of the steering column electrical connector assembly is illustrated in FIGS. 3–5 and is identified generally by the numeral 10A. The assembly 10A comprises a steering column cassette 12A and a steering wheel cassette 14A which are substantially similar to the corresponding components of the assembly 10 described above and illustrated in FIGS. 1 and 2. However, the steering column cassette 12A includes concentric recesses 22A–30A which are similar to the recesses 22–30 of the steering column cassette 12, but which are of generally semicircular cross-sectional configuration. Continuous concentric portions of the concentric recesses 22A–30A are appropriately plated with an electrically conductive material and therefore define concentric conductive tracks 32A–40A which are structurally and functionally similar to the conductive tracks 32–40 of the steering column cassette 12. In a similar manner, the steering wheel cassette 14A is provided with concentric recesses 82A–90A which are similar to the concentric recesses 82–90 in the steering wheel cassette 14, but which are of semicircular cross section. The concentric recesses 82A–90A formed in the steering wheel cassette 14A also are provided with conductive plating to define discrete concentric conductive tracks 92A–100A which are similar to the concentric conductive tracks 92–100 in the steering wheel cassette 14 described and illustrated above.

Unlike the assembly 10, the assembly 10A depicted in FIGS. 3–5 does not include the array of concentric wave washers. Rather, the electrical connection between the concentric conductive tracks 32A–40A of the steering column cassette 12A and the concentric conductive tracks 92A–100A of the steering wheel cassette 14A are provided by resilient electrically conductive spheres 140. In particular, the spheres 140 are formed from an electrically conductive silicone having elastomeric characteristics and impregnated with a precious or semiprecious metal. The resilient conductive spheres 140 are dimensioned to be elastomerically engaged in rolling contact in their respective semicircular cross-sectional concentric recesses 22A–30A of the steering column cassette 12A and the corresponding semicircular cross-sectional concentric recesses 82A–90A of the steering wheel cassette 14A. The elastomeric characteristics and the dimensions of the conductive spheres 140 ensure a high quality electrical connection to the respective concentric conductive tracks 32A–40A and 92A–100A. Additionally, the spherical configuration of the conductive spheres 140 ensures that the spheres 140 will roll into secure electrical contact for all angular orientations of the steering wheel cassette 14A relative to the steering column cassette 12A.

A plurality of the resilient conductive spheres 140 are disposed in each of the respective concentric recesses 22A–30A and 82A–90A. The spheres 140 in each of the respective aligned recesses are maintained in a fixed circumferential position relative to one another by spacer disk 142. More particularly, the spacer disk 142 is a generally planar unitary structure of annular configuration with a plurality of apertures 144 therein. Each aperture 144 is dimensioned to loosely retain a sphere 140, but to maintain the sphere 140 at a generally specified radial and circumferential location. More particularly, the apertures 144 are formed in the spacer disk 142 such that a plurality of the spheres 140 are disposed in spaced angular relationship in each of the respective concentric recesses 32A–40A and 82–90A. The spacer disk 142 can be molded or otherwise formed from an appropriate nonconductive material. However, this simple construction ensures that the resilient conductive spheres 140 are substantially evenly spaced about the cassettes 12A and 14A to achieve a high quality redundant electrical connection between the respective circuits in the cassettes 12A and 14A.

Figure 6:
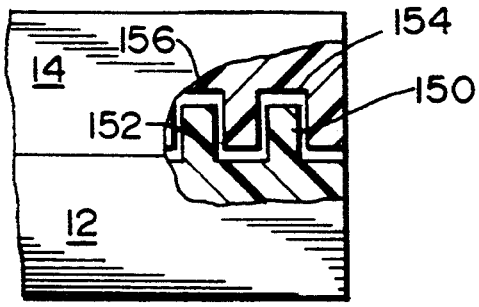
FIG. 6 is a cross-sectional view of a splash resistant seal for incorporation into the electrical connector assembly in accordance with the subject invention.
Figure 7:
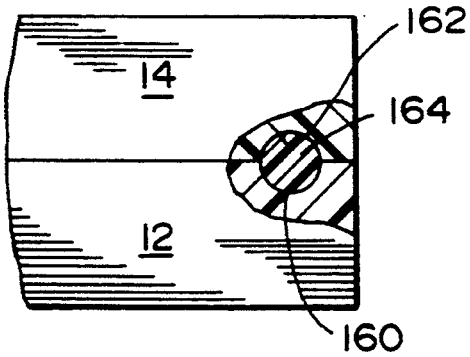
FIG. 7 is a cross-sectional view of an alternate seal for incorporation into the subject electrical connector assembly.
Figure 8:
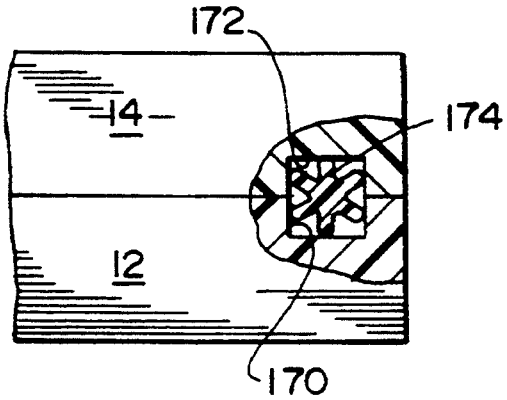
FIG. 8 is a cross-sectional view of a second alternate seal for incorporation into the subject electrical connector assembly.

In many situations it may be desirable for the cassettes to provide or contribute to environmental sealing of the electrical circuits contained therein. Optional environmental sealing means for the cassettes described and illustrated above are shown in FIGS. 6–8. It will be appreciated that FIGS. 6–8 are partial cross-sectional views of the cassettes 12 and 14 taken at radially outwardly disposed locations thereon. The sealing structures shown in the cross sections of FIGS. 6–8 would be generally annular in plan view and extend substantially entirely around the circumference of the respective cassettes 12 and 14 or 12A and 14A. Similar or identical seals also could be disposed at radially inner locations. In particular, FIG. 6 shows the nonconductive molded portions of the steering column cassette 12 being formed with pairs of annular spaced apart ribs 150 and 152. The steering wheel cassette 14 is provided with corresponding annular grooves 154 and 156 which are disposed and dimensioned to engage the ribs 150 and 152. As illustrated in FIG. 6, the ribs 150 and 152 are loosely received within the grooves 154 and 156 to permit free rotation of the steering wheel cassette 14 relative to the steering column cassette 12. Although the construction shown in FIG. 6 would provide splash resistance acceptable for most applications, it could not be considered to provide vapor resistance which may be required in certain instances.

FIGS. 7 and 8 show seal configurations which can be vapor resistant. In particular, FIG. 7 shows annular grooves of generally semicircular cross section formed in radially outward locations on the steering column cassette 12 and the steering wheel cassette 14. The grooves 160 and 162 are dimensioned to receive an annular gasket 164. The relative dimensions of the grooves 160, 162 and the gasket 164 and the materials from which the gasket 164 is formed should be selected to provide an acceptable degree of environmental sealing without significantly affecting the free rotation of the steering wheel cassette 14 relative to the steering column cassette 12.

FIG. 8 shows the steering column cassette 12 and the steering wheel cassette 14 formed respectively with grooves 170 and 172 of generally rectangular cross section. A resilient ribbed gasket 174 is mounted in the grooves 170 and 172 to provide the necessary environmental sealing without impeding upon the free rotatability of the steering wheel cassette 14 relative to the steering column cassette 12.

Figure 9:
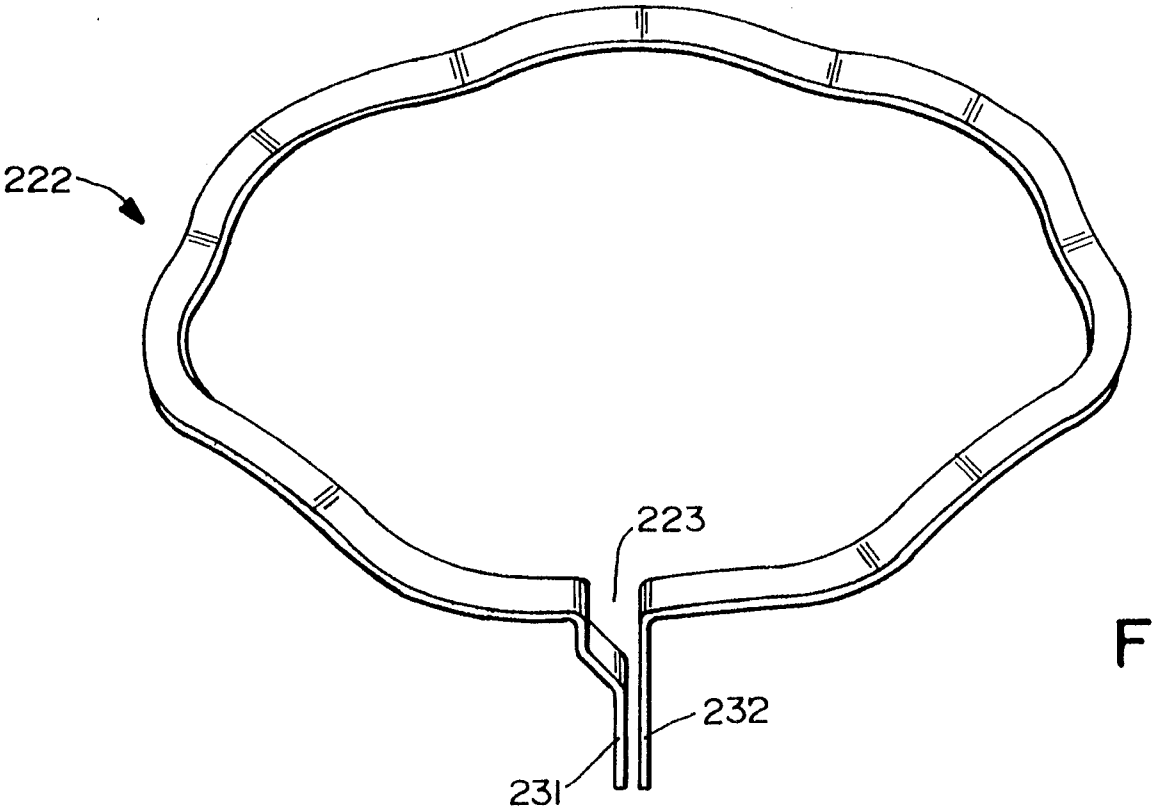
FIG. 9 is a perspective view of an alternate wave washer terminal in accordance with the subject invention.

An alternate to the previously described embodiments employs a split wave washer which is identified generally by the numeral 222 in FIG. 9. It is to be understood that the split wave washer 222 is the outermost wave washer in an array of concentric wave washers. The split wave washer 222 and other similar wave washers in the concentric array are stamped and formed from unitary pieces of conductive metal to define a generally circular plan view with a plurality of undulations extending around the periphery. In this manner, the split wave washer 222 can be received in corresponding annular recesses in the steering column cassette or the steering wheel cassette, as explained and illustrated further below. The split wave washer 222 differs from the corresponding wave washer 122 described and illustrated above. More particularly, the split wave washer 222 does not define a continuous annulus about its periphery. Rather, the split wave washer 222 is formed to define a pair of generally parallel spaced apart contact tabs 231 and 232 extending therefrom at a radially aligned split 233 therein and aligned generally parallel to the rotational axis of the steering wheel cassette of the electrical connector assembly in which the wave washer 222 is employed.

Figure 10:
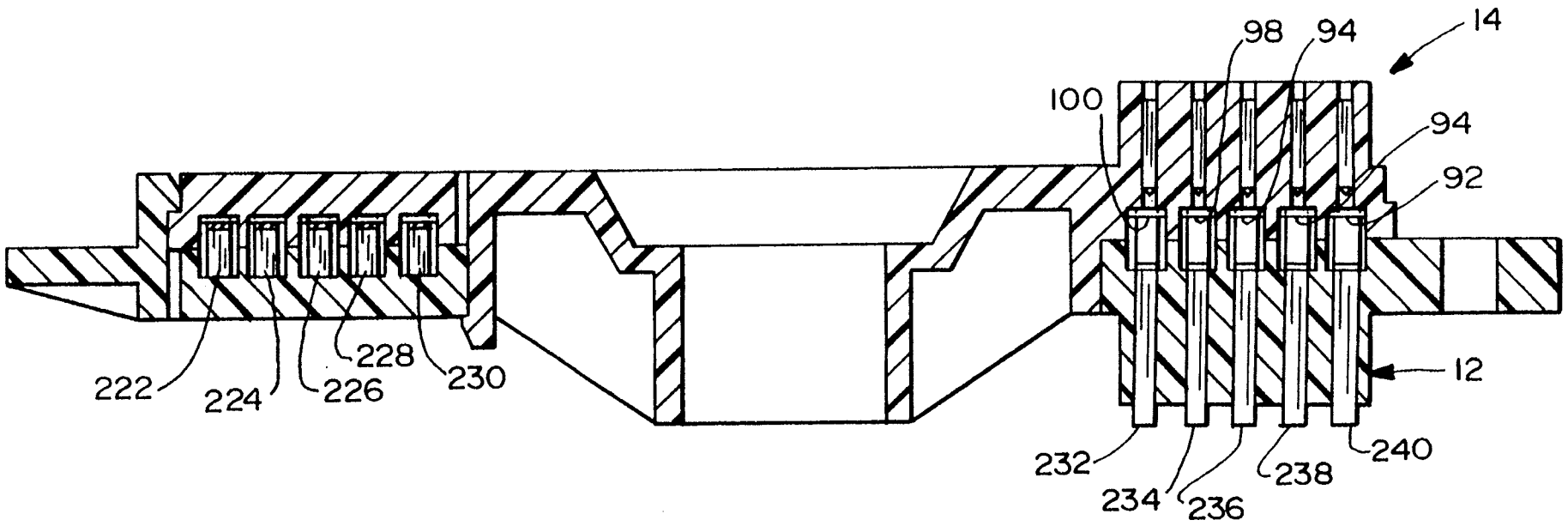
FIG. 10 is a cross-sectional view of an electrical connector assembly employing the wave washer terminal depicted in FIG. 9.

Turning to FIG. 10, the split wave washer 222 is shown in combination with the concentric split wave washers 224, 226, 228 and 230 which are provided with contact tabs 234, 236, 238 and 240 respectively. The split wave washers 222–230 are placed in concentric recesses 22–30 respectively of the steering column cassette 12 depicted and described in greater detail above. However, in the previously described embodiments, contact between the concentric conductive portions and an external electrical connector were provided by pins and plated or insert molded regions extending through apertures 42–50 in the steering column cassette 12. In the subject embodiment, however, the contact tabs 232–240 of the respective split wave washers 222–230 are received in the apertures 42–50 to enable appropriate electrical connection with an external electrical connector. The steering column cassette 12 is mated with a steering wheel cassette 14 which is substantially identical to the steering wheel cassette 14 depicted in FIG. 2 and described in detail above. More particularly, the steering wheel cassette 14 has concentric recesses 82–90 molded therein with continuous annular electrically conductive portions plated or insert molded therein.

With the embodiment depicted in FIG. 10, the split wave washers 222–230 directly contact the concentric conductive tracks 92–100 without the need for separate wave washers disposed between a pair of opposed printed or insert molded annular concentric conductive traces as in the previous embodiments. Thus, the embodiment depicted in FIG. 10 can provide manufacturing and cost efficiencies in certain instances.

Figure 11:
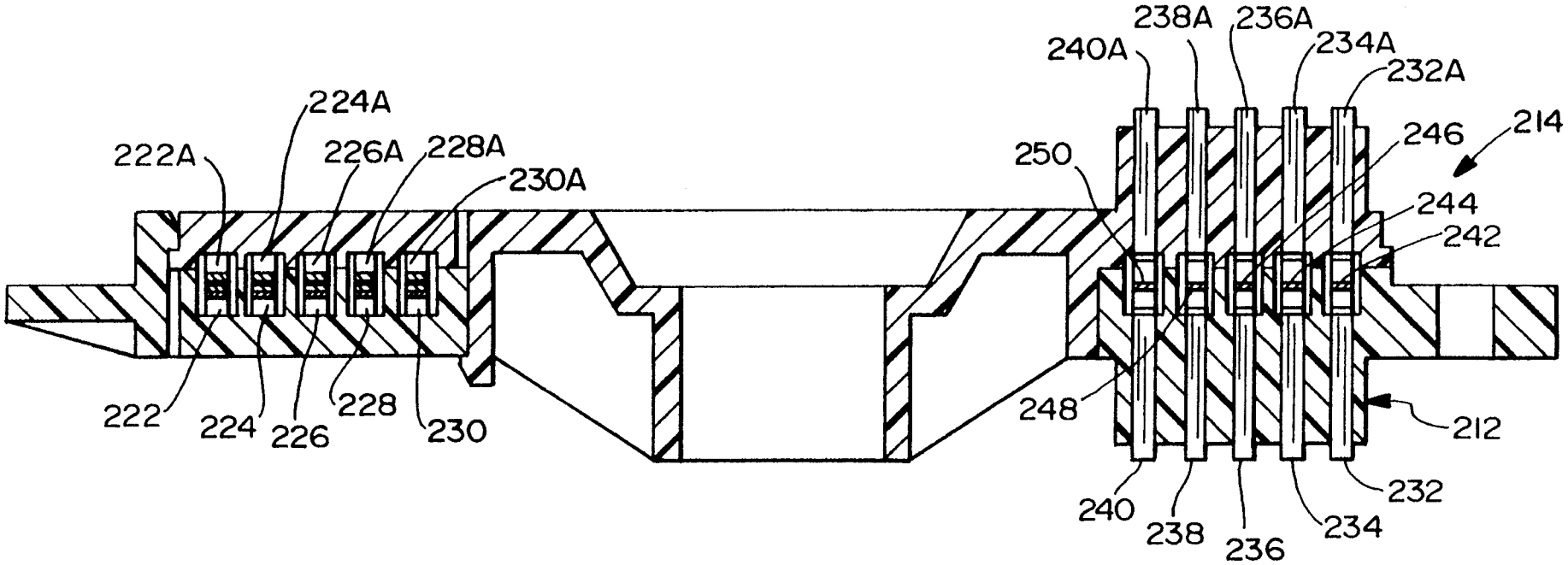
FIG. 11 is a cross-sectional view similar to FIG. 10 but showing an electrical connector assembly employing opposed pairs of wave washer terminal as depicted in FIG. 9.

Still another embodiment of the subject invention is illustrated in FIG. 11. In particular, the FIG. 11 embodiment employs a steering column cassette 212 and a steering wheel cassette 214 which are similar to those described in the previous embodiments. The steering column cassette 212 is provided with annular concentric split wave washers 222–230 which are identical to those described and illustrated with respect to FIGS. 9 and 10, and thus include contact tabs 232–240 respectively. The steering wheel cassette 214 is provided with identical split wave washers 222A–230A mounted in the respective concentric recesses thereof, but in opposed relationship to the wave washers in the steering column cassette 212. Thus, the split wave washers 222–230 are oriented such that the respective contact tabs 232–240 thereof extend downwardly through the steering column cassette 212 in the orientation depicted in FIG. 11. On the other hand, the concentric split wave washers 222A–230A of the steering wheel cassette 214 are oriented such that there contact tabs 232A–240A extend upwardly in the FIG. 11 orientation.

The embodiment of the subject invention depicted in FIG. 11 further includes generally planar metallic washers 242–250 disposed intermediate the opposed split wave washers 222–230 and 222A–230A respectively. The planar washers 242–250 ensure consistent high contact forces between the wave washers 222–230 and 222A–230A for all rotational orientations of the steering wheel cassette 214 relative to the steering column cassette 212.

It will be noted that the annular concentric recesses in the steering column cassette 212 are deeper than the corresponding recesses in the steering wheel cassette 214. More particularly, the recesses in the steering column cassette 212 define a depth which exceeds the height of the undulations in the respective split wave washers 222–230. As a result, the planar washers 242–250 are engaged in the recesses of the steering column cassette 212 to prevent shifting of the planar washers 242–250 in a lateral or radial direction. It follows, therefore, that the wave washers 222A–230A in the steering wheel cassette 214 extend beyond the mating face of the steering wheel cassette 214 and into the recesses of the steering column cassette 212.

In summary, a steering column electrical connector assembly is provided comprising a steering column cassette and a mateable steering wheel cassette which are engageable with one another to permit free rotation therebetween. Arrays of concentric recesses are formed on the mating surfaces of the steering column cassette and steering wheel cassette. The mating surface of at least one cassette may further be provided with discretely disposed concentric electrically conductive portions in register with the respective recesses. Resilient electrically conductive members such as resilient wave washers or resilient electrically conductive spheres are disposed between the cassettes and are retained in alignment with the concentric conductive pathways on the respective cassettes. The resilient electrically conductive members may be wave washers in one or both cassettes. In certain embodiments the wave washers include contacts extending in a generally axial direction for electrical contact with an external connector. A planar washer is disposed between two registered wave washers in certain embodiments. The use of resilient conductive members provides an extremely efficient, inexpensive and noise-free high quality redundant electrical connection between the respective concentric conductive passages. The subject construction also enables continuous bidirectional rotation and substantially increased circuit density. The steering column cassette and the steering wheel cassette can be appropriately formed for the required degree of environmental sealing.

While the invention has been described with respect to certain preferred embodiments, it is apparent that various changes can be made without department from the scope of the invention as defined by the appended claims. In particular, other configurations of resilient conductive members retained in the concentric recesses can be provided. Similarly, the annular conductive portions of the respective cassettes may be formed by insert molding, stamped circuitry or other means. Additionally, many other possible environmental sealing constructions can be employed to achieve the required degree of splash protection or environmental sealing.

I claim:

1. An electrical connector assembly for achieving electrical connection between first and second members at least one of which is rotatable relative to the other, said assembly comprising:

a first housing mountable to said first member and comprising a nonconductive portion having a mating face and at least one annular conductive portion fixedly disposed on said mating face;

a second housing mountable to said second member and comprising a nonconductive portion having a mating face disposed in generally opposed relationship to the mating face of said first housing, said second housing having at least one resilient annular conductive portion nonrotatably disposed on the mating face thereof generally in register with the annular conductive portion on the mating face of said first housing, the resilient annular conductive portions of said second housing including resilient undulations therein, said undulations being in direct electrical and direct mechanical contact with the annular conductive portions of the first housing in register therewith, each said resilient annular conductive portion including a contact tab for electrical connection to an electrical connector nonrotatably mounted to the second housing; and wherein the mating face of at least one of said first and second housings comprises at least one annular recess, with at least part of the resilient annular conductive portion of said second housing being disposed in said annular recess, whereby said annular recess retains the resilient annular conductive portion at a radial position for electrically contacting the annular conductive portions in the first housing.

2. An electrical connector assembly as in claim 1 wherein said first and second housings each comprise at least one annular recess in the respective mating faces thereof, the annular conductive portions thereof being disposed in said recesses.

3. An electrical connector assembly as in claim 1 wherein said first and second housings each comprise a plurality of annular conductive portions disposed on the mating faces thereof, with the annular conductive portions of said first housing being registered with the respective annular conductive portions of said second housing.

4. An electrical connector assembly as in claim 1 wherein the contact tab of the resilient annular conductive portion extends generally parallel to the rotational axis for the relative rotatable movement between said first and second members.

5. An electrical connector assembly as in claim 1 further comprising a nonconductive lubricant between the mating faces of the first and second housings for preventing wear to the annular conductive portions.

6. An electrical connector assembly for achieving electrical contact between a first member and a second member which is rotatable relative to said first member, said assembly comprising:

a first nonconductive housing having a mating face formed with an array of concentric recesses therein;

a first array of annular conductors nonrotatably disposed in the concentric recesses of the first housing;

a first array of conductor means extending in nonradial directions away from the mating face of the first housing for electrical connection between the respective annular conductors in the first array of annular conductors and a first electrical connector;

a second housing having a mating face formed with an array of concentric recesses therein such that the concentric recesses on the second housing are in register with the concentric recesses of the first housing, said second housing being formed to include an array of nonradially aligned apertures extending from the respective annular recesses and away from the mating face of the second housing;

a second array of annular conductors disposed respectively in the concentric recesses of the second housing, the annular conductors in the second array of annular conductors each defining a split wave washer having a plurality of resilient undulations formed therein and having a split in the periphery thereof, the undulations being dimensioned to achieve direct electrical and direct mechanical contact with the respective annular conductors in the first array of annular conductors; and a second array of conductor means extending in nonradial directions away from the mating face of the second housing for electrical connection between the respective annular conductors in the second array of annular conductors and a second electrical connector, the conductor means of the second array of conductor means each defining a contact tab unitary with the respective split wave washers and extending in a nonradial direction at a location thereon generally at the split therein.

7. An electrical connector assembly as in claim 6 wherein the annular conductors in the first array of annular conductors define split wave washers substantially identical to the split wave washers in the second array of annular conductors, and with contact tabs unitary with said split wave washers defining the first array of nonradially aligned conductor means.

8. An electrical connector assembly as in claim 6 wherein the annular conductors in the first array of annular conductors are insert molded into the first housing, such that the first housing defines a continuous matrix of nonconductive material surrounding and engaging at least portions of the annular conductors of the first housing.

9. An electrical connector assembly as in claim 6 further comprising a nonconductive lubricant between the mating faces of the first and second housings for preventing wear to the annular conductive portions.

10. An electrically conductive terminal for achieving electrical *and mechanical* contact with a second terminal at all rotational positions about a rotational axis, said terminal being stamped and formed from a unitary piece of conductive material to define a split wave washer generally concentric with the rotational axis, said split wave washer being characterized by a plurality of undulations formed therein and a radially aligned split extending therethrough, and a pair of contact tabs extending unitarily from the wave washer on opposite sides of the split therein and aligned in a nonradial direction *and wherein at least one of said terminals is rotatably mounted relative to the other.*

11. An assembly of electrical terminals for achieving electrical contact with one another at all relative rotational positions of said terminals about a rotational axis, said pair of terminals comprising:

a first generally annular terminal substantially concentric with the rotational axis; and a second generally annular terminal substantially concentric with the rotational axis, said second terminal in direct electrical and direct mechanical contact with said first annular terminal defining a split wave washer having a plurality of undulations therein and having a split extending therethrough, said second terminal further comprising a contact tab unitary therewith and extending in a nonradial direction from a portion thereof adjacent the split *and wherein at least one of said terminals is rotatably mounted relative to the other.*

12. An assembly of terminals as in claim 11 wherein the first terminal is substantially identical to the second terminal.

13. An electrical connector assembly mounted about the longitudinal axis of a torque transmitting shaft which shaft passes through said assembly and has a rotational relationship with a part which is stationary or rotating for achieving electrical connection between first and second members, at least one of said members being rotatable relative to the other, said assembly comprising:

a first housing mountable to said first member and comprising a nonconductive portion having a mating face and at least one first annular conductor insert molded to said first housing such that the nonconductive portion of said first housing defines a continuous matrix of nonconductive material surrounding and supporting portions of said first annular conductor and with said first annular conductor being exposed adjacent the mating face of said first housing;

a second housing mountable to said second member and comprising a nonconductive portion having a mating face disposed in generally opposed relationship to the mating face of said first housing, said first and second housings being rotatable relative to one another, said second housing having at least one second annular conductor insert molded therein such that the nonconductive portion of the second housing defines a continuous matrix surrounding and supporting portions of said second annular conductor and with the second annular conductor being exposed adjacent the mating face of said second housing to define at least one pair of opposed annular conductors, the annular conductors of the first and second housings being in spaced relationship to one another; and at least one resilient wave washer disposed between the mating faces of said first and second housings and retained at a radial position for resiliently engaging the first and second annular conductors for achieving electrical connection therebetween, while permitting rotating of said first and second housings relative to one another.

14. An electrical connector assembly as in claim 13 further comprising a nonconductive lubricant between the mating faces of the first and second housings for preventing wear to the annular conductive portions.

15. An electrical connector assembly as in claim 14 wherein the lubricant is a substantially chemically inert hydrocarbon.

*16. An electrical connector assembly for achieving electrical connection between first and second members at least one of which is rotatable relative to the other, said assembly comprising:*

*a first housing mountable to said first member and comprising a nonconductive portion having a mating face and at least one annular conductive portion fixedly disposed on said mating face;*

*a second housing mountable to said second member and comprising a nonconductive portion having a mating face disposed in generally opposed relationship to the mating face of said first housing, said second housing having at least one resilient annular conductive portion nonrotatably disposed on the mating face thereof generally in register with the annular conductive portion on the mating face of said first housing, the resilient annular conductive portions of said second housing including resilient undulations therein, said undulations being in direct electrical and direct mechanical contact with the annular conductive portions of the first housing in register therewith, each said resilient annular conductive portion including an electrical connection to an electrical connector nonrotatably mounted to the second housing; and*

*wherein the mating face of at least one of said first and second housings comprises at least one annular recess, with at least part of the resilient annular conductive portion of said second housing being disposed in said annular recess, whereby said annular recess retains the resilient annular conductive portion at a radial position for electrically contacting the annular conductive portions in the first housing.*

* * * * *